(12) United States Patent
Gilbert et al.

(10) Patent No.: US 8,170,866 B2
(45) Date of Patent: May 1, 2012

(54) SYSTEM AND METHOD FOR INCREASING ACCURACY OF SEARCHES BASED ON COMMUNICATION NETWORK

(75) Inventors: Mazin Gilbert, Warren, NJ (US); Christopher Volinsky, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/164,347

(22) Filed: Jun. 20, 2011

(65) Prior Publication Data
US 2011/0246184 A1 Oct. 6, 2011

Related U.S. Application Data

(63) Continuation of application No. 11/931,830, filed on Oct. 31, 2007, now Pat. No. 7,966,171.

(51) Int. Cl.
*G10L 17/20* (2006.01)

(52) U.S. Cl. .............................. 704/8; 704/255; 704/257

(58) Field of Classification Search ................. 704/1–10, 704/257, 251, 252, 253, 254, 255
See application file for complete search history.

(56) References Cited

U.S. PATENT DOCUMENTS 7,103,542 B2 * 9/2006 Doyle ........................... 704/231
7,533,020 B2 * 5/2009 Arnold et al. .................. 704/257

* cited by examiner

*Primary Examiner* — Huyen X. Vo

(57) ABSTRACT

Disclosed are systems, methods and computer-readable media for using a local communication network to generate a speech model. The method includes retrieving for an individual a list of numbers in a calling history, identifying a local neighborhood associated with each number in the calling history, truncating the local neighborhood associated with each number based on the at least one parameter, retrieving a local communication network associated with each number in the calling history and each phone number in the local neighborhood, and creating a language model for the individual based on the retrieved local communication network. The generated language model may be used for improved automatic speech recognition for audible searches as well as other modules in a spoken dialog system.

20 Claims, 3 Drawing Sheets

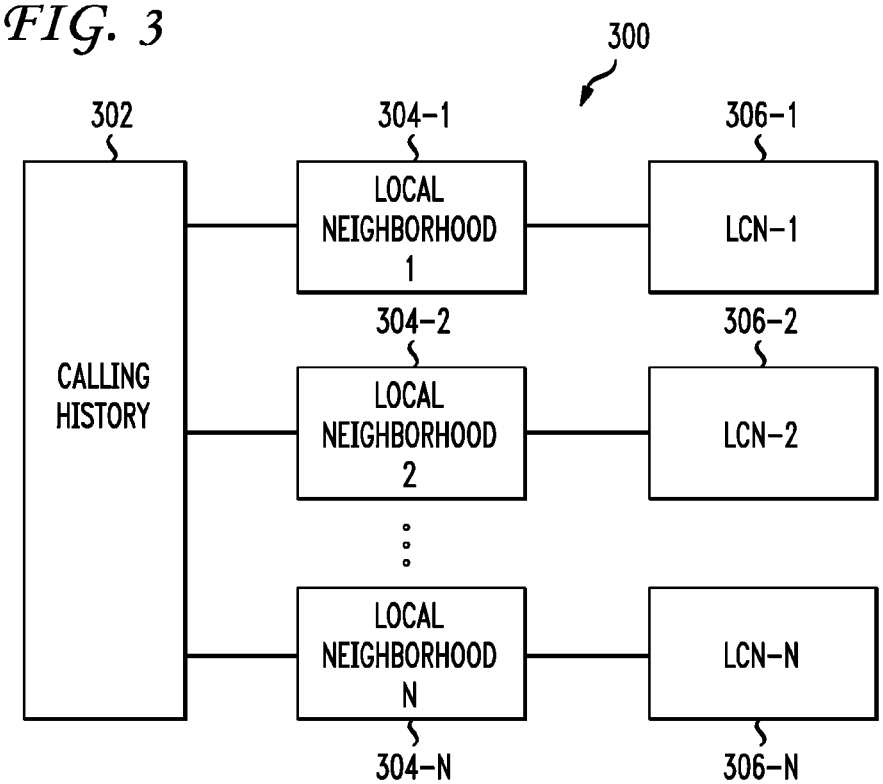
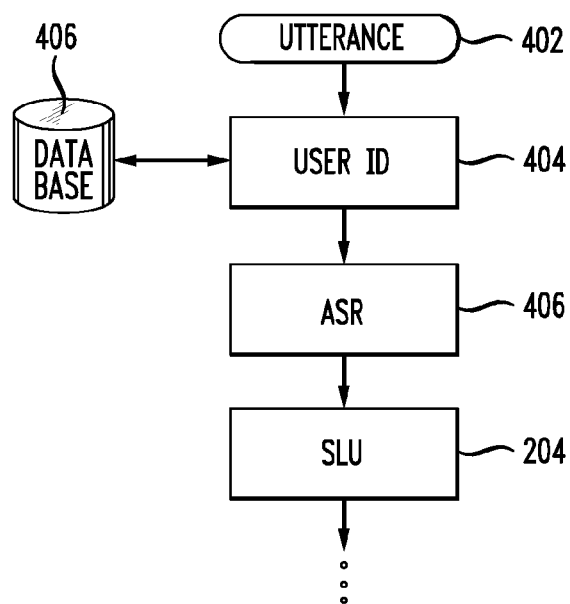

SYSTEM AND METHOD FOR INCREASING ACCURACY OF SEARCHES BASED ON COMMUNICATION NETWORK

PRIORITY INFORMATION

The present application is a continuation of U.S. patent application Ser. No. 11/931,830, filed Oct. 31, 2007, the content of which is included herewith in its entirety.

BACKGROUND OF THE INVENTION

1. Field of the Invention

The present invention relates to spoken dialog systems and more specifically to a system and method of using a local communication networks to generate more accurate speech recognition models which may be deployed in a spoken dialog system.

2. Introduction

Search for information on the web using a mobile phone is an area that has been expanding significantly over the last several of years. This is at least in part to the exponential growth in the number of mobile users and their willingness to pay for data access. There are over 15 billion search queries made on the web annually while the number of text search queries over the phone is fewer than 30 million per year. However, there is an increasing trend especially among younger generation to use mobile phones as a primary medium for an information search. Mobile information search is a major growth area that continues to expand exponentially year-after-year and is an important opportunity for new business remedy.

There are two main challenges in mobile information access. First, the small screen size limits the amount of information output, and second, the lack of a keyboard poses difficulty when typing words or phrases. This is also applicable in small devices such as Blackberry or Palm Trio devices where the keyboard is small and relatively difficult to use, especially while on the go. What is needed in the art is an improved mechanism to enable users to perform search through providing search terms audibly over a telephone.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and a computer-readable medium that address the issue identified above by providing a smarter speech interface for telephone or audible searches by creating personalized and adaptive models for each user (or group of users) based on the concept of a "local communication network". Phone users can search for information easily using speech input and obtain superior search retrieval accuracy using the principles of the invention. High accuracy and reliability of search will not only increase the number of users depending on speech input as the primary means for mobile information access or telephone information access but it could also provide increased revenue. A method aspect of the invention includes using a local communication network to generate a speech recognition model. The method includes retrieving from an individual a list of numbers in a calling history, identifying a local neighborhood associated with each number in the calling history, truncating the local neighborhood associated with each number based on at least one parameter, retrieving a local communication network associated with each number in the calling history and each phone number in the local neighborhood, and creating a language model for the individual based on the retrieved local communication network.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 3 illustrates the basic components according to an aspect of the invention;

FIG. 4 illustrates further basic modules that may be utilized in connection with the invention.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
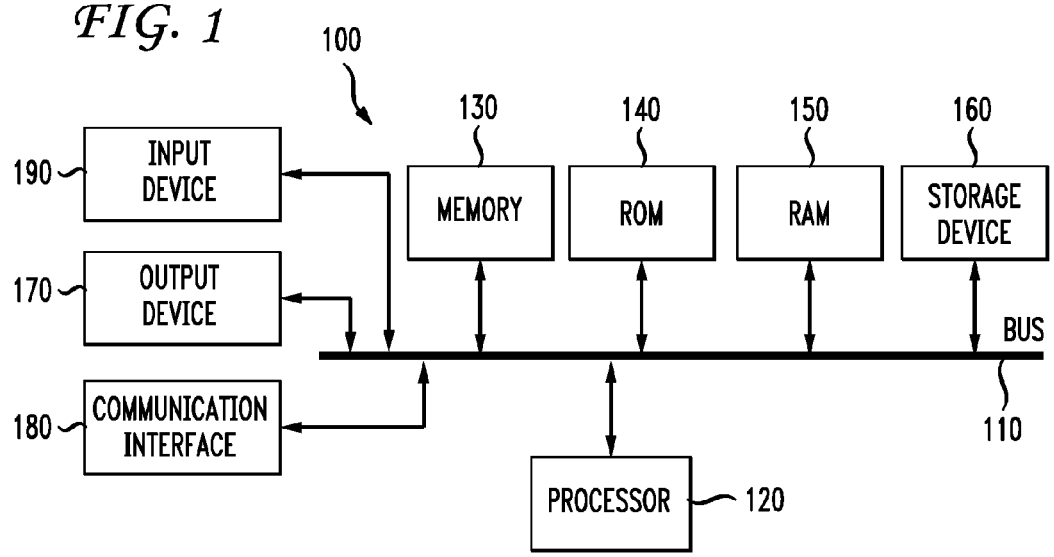
FIG. 1 illustrates the basic system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 2:
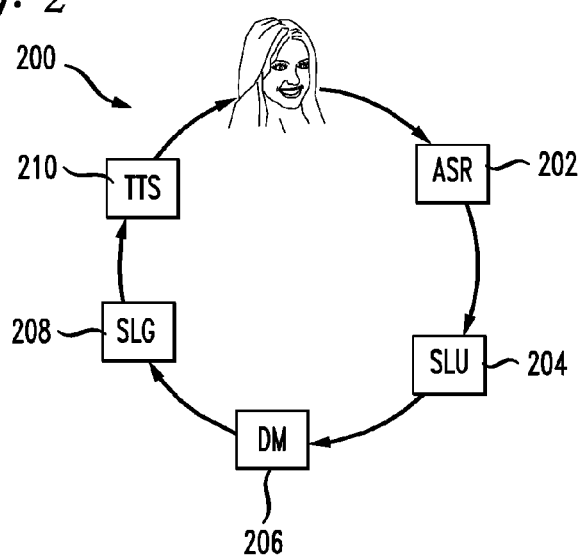
FIG. 2 illustrates the basic components of a spoken dialog system.

Spoken dialog systems aim to identify intents of humans, expressed in natural language, and take actions accordingly, to satisfy their requests. FIG. 2 is a functional block diagram of an exemplary natural language spoken dialog system 200. Natural language spoken dialog system 200 may include an automatic speech recognition (ASR) module 202, a spoken language understanding (SLU) module 204, a dialog management (DM) module 206, a spoken language generation (SLG) module 208, and a text-to-speech (TTS) module 210. The TTS module may be any type of speech output module. For example, it may be a module wherein one of a plurality of prerecorded speech segments is selected and played to a user. Thus, the TTS module represents any type of speech output. The present invention focuses on innovations related to the dialog management module 106 and may also relate to other components of the dialog system.

ASR module 202 may analyze speech input and may provide a transcription of the speech input as output. SLU module 204 may receive the transcribed input and may use a natural language understanding model to analyze the group of words that are included in the transcribed input to derive a meaning from the input. The role of DM module 206 is to interact in a natural way and help the user to achieve the task that the system is designed to support. DM module 206 may receive the meaning of the speech input from SLU module 204 and may determine an action, such as, for example, providing a response, based on the input. SLG module 208 may generate a transcription of one or more words in response to the action provided by DM 206. TTS module 210 may receive the transcription as input and may provide generated audible speech as output based on the transcribed speech.

Thus, the modules of system 200 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 200, which the user then hears. In this manner, the user can carry on a natural language dialog with system 200. Those of ordinary skill in the art will understand the programming languages and means for generating and training ASR module 202 or any of the other modules in the spoken dialog system. Further, the modules of system 200 may operate independent of a full dialog system. For example, a computing device such as a smartphone (or any processing device having a phone capability) may have an ASR module wherein a user may say "call mom" and the smartphone may act on the instruction without a "spoken dialog."

The principles disclosed herein may be employed to use data and knowledge from the "local communication network" to create customized and personalized speech recognition models that would result in high accuracy information speech searches. Many companies including Google®, Yahoo®, AT&T, Microsoft, among others, are engaged in activities to allow users to say a few words or phrases that can be used for information search. The difficulty with using speech input for mobile or audible information search is poor accuracy of the speech recognizer (202) when presented with open vocabulary. As a reference point, state-of-the-art recognizers can achieve about 70% word recognition accuracy for 100,000 words with perplexity (the average number of different words spoken following a given word) of around 60-80. However, the perplexity when dealing with information search is significantly more than 80 and can reach in the order of thousands. This reflects the numerous variability in the keywords that different users apply when performing mobile information search. For perplexity figures at that level, it is expected to open vocabulary information search using speech input that can only reach levels of 20-30% word accuracy. At these accuracy levels, speech information search is quite impractical. As a result of this, there have been no commercial capabilities for general-purpose mobile information search using speech input. Instead, the previous best technology available could only support limited search, such as directory assistance with automation levels in the region of 40-50%.

FIG. 3 illustrates some basic understanding of a possible definition of a local communication network. First a calling history 302 is associated with a user, a phone device, a business or any other organized grouping of a calling history. Each phone number in the calling history may have an associated local neighborhood 304-1, 304-2, . . . 304-n. The local neighborhood may be defined as a list of other numbers which called or are called by the given number in the calling history, and may entail other information such as a billing history, location-based information (i.e., an identified location of a user when a given number is called or called the given number) and so forth. This list is typically received based on a calling history of other individuals. Associated with each number (or piece of data) in the local neighborhood, is a local communication network (LCN) LCN-1 (306-1), LCN-2

(306-2), . . . LCN-n (306-*n*) represents further corresponding data associated with each local neighborhood. For example, each number or piece of data in the local neighborhood will have a corresponding entity, business name, person name, or other data associated with the number. Gathering this information may be accomplished using a search or database retrieval from a stored directory. In one aspect, the list of phone numbers in the local neighborhood and corresponding entity and other data associated with each number may be referred to as the overall LCN 300 for an individual or other entity. As an example, the LCN may represent a list of potential entities that a user calls or would most likely call. Thus, the listing of pizza, restaurants, various shops, insurance, business, family members and so forth are all identified within this overall local communication network for an individual, device and so forth.

FIG. 4 illustrates another basic aspect of the use of the invention. Utterance 402 may be received by a spoken dialog system which may perform some preprocessing such as user identification 404. In this regard, an example would be to identify the user according to known speaker identification techniques and based on the identification of the user, retrieving from a database 406 an identification of a speech recognition model or other personal speech models that may be then dynamically employed using an ASR 406 system. The utterance is then interpreted wherein the speech is converted into text and then passed on for further processing to other modules in a spoken dialog system such as a spoken language module 204. In this manner, the system may be able to utilize an improved speech model that is dynamically generated for a particular user and takes advantage of the information contained in the user local communication network. The local communication network may be periodically or continuously updated or pruned as calling patterns evolve over time.

Figure 5:
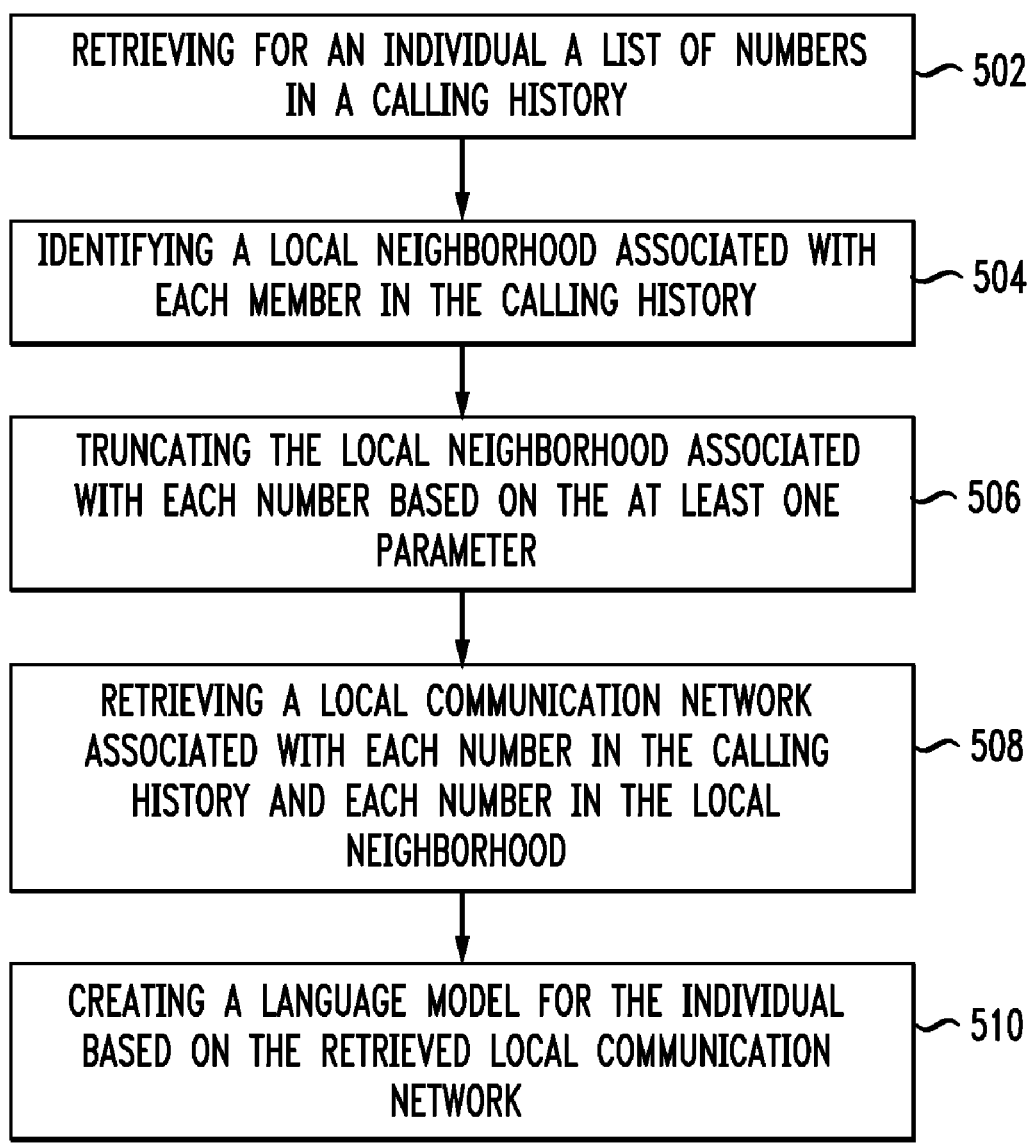
FIG. 5 illustrates a method embodiment of the invention.

FIG. 5 illustrates an example method embodiment of the invention. As shown, the method uses the local communication network to generate a speech recognition model. An exemplary method includes retrieving for an individual a list of numbers in a calling history (502), identifying a local neighborhood associated with each member in the calling history (504), truncating the local neighborhood associated with each number based on the at least one parameter (506), retrieving a local communication networked associated with each number in the calling history and each number in the local neighborhood (508) and creating a language model for the individual based on the retrieved local communication network.

As noted above, the "individual" discussed above may also be just a device, group of business, a family or any other grouping which may be defined as the "individual". The local neighborhood may be defined as a list of numbers which called or are called by the given number. Again, this list may be retrieved based on a calling history of other individuals as well as the calling history of the device or the individual making the calls. Truncating the local neighborhood, using known techniques, a method of retaining on the most relevant neighbors of the given number. In other words, there may be outliers in the local neighborhood that have only been called once over the last ten years which may not be as relevant to other numbers that are constantly called. Truncating the local neighborhood may occur at a specified interval, such as every week or after every call placed or call received, or may occur continuously.

Using the LCN 300, speech recognition models are created. The list of entities are used to create a pronunciation dictionary and a language model which may be either deterministic (i.e., a list of entities) or a stochastic model (i.e., which entity may be spoken with words and its weight based on its usage and frequency such as the spoken words "call Pizza Hut in Summitt"). It is preferred that a universal acoustic model is used for all users. However, user adaptive acoustic models may also be applied.

Once the speech recognition model is created, a user may invoke a command simply by simply speaking to a device. The LCN-based speech recognition models then help to narrow down the search space and improve the recognition performance. It may be calculated that perplexity of the search may be reduced from what may be in the order of thousands to below 50. Infrequent entities are assigned small language model weight. Another embodiment of the invention is the speech recognition model itself generated according to the method set forth above as well as the spoken language dialog system which implements an automatic speech recognition model using the approach above. Furthermore, the language models generated for automatic speech recognition may also include data which may be useful for other modules in the spoken dialog system 200. For example, the listing of businesses or entities that are typically called by the user may provide data to aid in generating an appropriate response by a dialog manager or a spoken language generation module. Accordingly, the use of the language models generated herein is not limited just to the automatic speech recognition module.

A benefit of using a local communication network to improve speech information search is a drastic reduction of word perplexity which results improvement in information search accuracy using speech input. This approach would also further promote more users to depend on traditional phones and mobile phones for information access using speech.

Another aspect of the invention further provides dynamic and continual updating of the speech models. For example, a phone number that may have been called once in the last ten years perhaps may be truncated from an earlier process of developing the speech model, but the truncated data may be stored in a database in case a user starts to call the phone number again. In other words, if the system were to delete the truncated data, if the user called that number again, then that number may be truncated a second time. However, with the truncation history available, the system may recognize an increased frequency in truncated phone numbers and then not truncate that particular phone number in a later iteration and thus, provide an improvement in the speech model for later recognition. Furthermore, trends may be identified such as a user switching from one pizza restaurant to another in which case once certain parameters are met, the system may prune out old data in the speech model based on stale information associated with what telephone numbers the user is dialing with new information.

Furthermore, a person may have a typical social network of 1,000 people or 1,000 phone numbers which some of them are businesses and many are consumers. The system may know the volume and frequency of how often the person makes these calls and using that frequency and distribution information may enable the system to provide weights to various pieces of data in the grammars. For example, if a user only calls a particular telephone company once a year then the weight in any grammar is very different for that piece of data then a user that calls their mother every day. Accordingly, an aspect of this disclosure is to perform an analysis on the local communication network and the data associated with that local communication network and weight pieces of information within the grammar according to frequency, length of call, and other perhaps ancillary information in determining those weights. Thus, the local communication network or social network that develops around a user, a phone number, or a device may be utilized to create a more accurate speech recognition model for such purposes as directory assistance services. In another aspect, each business in a local communication network may be categorized by some industry standard business code and therefore, the system would know that a particular user is the type of person that calls pizza places or if that is the type of person that generally calls home improvement places or financial institutions and so on. The system can then build a profile of each number in that sense which would enable a way for the system to create a similarity score between numbers and learn about qualitative factors of individual phone numbers.

Another aspect would be to utilize deeper information within the local communication network to aid in processing speech. In this example, assume that a user has never called Sam's Pizzeria in Summit, N.J. but one of their friends has. In other words, other people that are in the user's social network have called and have communicated with businesses that may also become part of the speech vocabulary of the user. In this regard, the steps of retrieving local neighborhood information and local communication network information may extend wherein phone numbers may be identified as businesses or friends of family within the local neighborhood. For example, the system may identify ten numbers in the local neighborhood of which four are to family members or to friends. An approach may be employed wherein the phone numbers called by the family and friends may also be explored and retrieved as well as associated data, business names and so forth of those numbers. In this regard, the common practice of a friend recommending a restaurant such as Sam's Pizzeria in Summit may be easily exploited according to the principles of the invention. In other words, if a user who has not been to Sam's Pizzeria calls up and forgets that name of "Sam's" but desires to go to that pizzeria in Summitt, the user may say "I would like to go to that pizzeria that John recommended in Summitt". Because the local communication network is expanded into phone numbers that John called (whose number is in the local neighborhood of the individual) the recognizer may be able to draw out that particular pizza restaurant that John calls and thus would have likely recommended to his friend.

In one aspect, the system gauges how to the extent that they broaden the database which can become too large. In other words, as the system were to expand out to new phone numbers called by and which receive calls in the local neighborhood, there may be different parameters for truncating or pruning out numbers which are in deeper layers of the local communication network rather than in higher layers such that the database only gathers the most utilized data.

It is preferable that unnecessary data is truncated. Roughly 90% of communication that an individual does is with the top 8 to 10 people on the list. So in one aspect, the system may truncate almost everybody else in terms of making the complexity of the problem much easier. In this regard, the system would only focus on the most relevant people and only include that data in the speech recognition system rather than incorporating hundreds of people into each person's model. One preferable method of truncating data is to use a proximity measurer. This would measure proximity between any two people. As is known in the art, this would be a simple measure of how many total minutes people talked to each other. Another parameter may be how many people you have in common with another person or how many businesses you call. In other words, one person may not talk to another person often but they may have three or four friends in common which may increase their proximity measure in the analysis. This proximity measure may be used in the truncation or pruning process.

Another concept in this regard is assigning a parameter or value to each person. For example, every month there may be a group of people an individual meets with and therefore typically makes phone calls that are short but are made on a regular basis, for example to coordinate the meeting. Without further data, a value assigned to this individual in terms of a measure of proximity may be reduced because the length of time for each phone call is short. However, since it is called on a fairly regular basis the system may allow for a dynamic modification of a model after this analysis wherein, perhaps, a week before the meeting the language model gets updated or selected to accommodate some of the data that otherwise wouldn't make this cut. In other words, the system may, knowing the timing of a calling history, preemptively select the appropriate language model to anticipate particular phone calls which an individual is likely to make. Another example of this is if an individual orders pizza from the same pizza restaurant every Friday night, the system may not employ such a language model Monday through Thursday, but deploy that particular speech recognition model on Friday in order to improve the increased understanding in anticipation of the pizza order.

An entity operating such a spoken dialog system may update dynamically various communities or user signatures on a regular basis such as Bailey. Such systems do realize that some relationships are dynamic, wherein a user makes one call for two hours every two or three months and in other relationships the user may talk for five minutes once a week. The parameterization of the social network may be set up or modified in such a way such that both of these types of situations would remain in the system and neither would get truncated out.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
receiving a calling history associated with an individual;
identifying data of a social network associated with each number in the calling history;
refining the data of the social network based on at least one parameter, to yield refined data of the social network; and
creating, via a processor, a language model for the individual based on the refined data of the social network.

2. The method of claim 1, wherein the data of the social network further comprises at least one of data corresponding to an entity, a business name, and a person's name.

3. The method of claim 1, further comprising implementing the language model in a spoken dialog system.

4. The method of claim 1, further comprising using the refined data of the social network to create a punctuation dictionary.

5. The method of claim 1, wherein the language model is one of a deterministic model and a stochastic model.

6. The method of claim 1, further comprising dynamically modifying the language model based on additional data.

7. The method of claim 1, further comprising implementing the language model in a spoken dialog system at a time based on a history of the individual and to anticipate user input.

8. A non-transitory computer-readable storage module containing instructions which, when executed by a computing device, cause the computing device to generate a speech recognition model, the instructions comprising:
retrieving a list of numbers in a calling history associated with an individual;
identifying data of a social network associated with each number in the list of numbers;
refining the data of the social network based on at least one parameter, to yield refined data of the social network; and
creating, via a processor, a language model for the individual based on the refined data of the social network.

9. The non-transitory computer-readable storage module of claim 8, wherein the data of the social network further comprises at least one of data corresponding to an entity, a business name, and a person's name.

10. The non-transitory computer-readable storage module of claim 8, wherein the method used to create the speech recognition further comprises using the refined data of the social network to create a punctuation dictionary.

11. The non-transitory computer-readable storage module of claim 8, wherein the language model is one of a deterministic model and a stochastic model.

12. The non-transitory computer-readable storage module of claim 8, further comprising dynamically modifying the language model based on additional data.

13. The non-transitory computer-readable storage module of claim 8, further comprising implementing the language model in a spoken dialog system at a time based on a history of the individual and to anticipate user input.

14. A spoken dialog system having a speech model, the spoken dialog system comprising:
a processor;
a first module configured to control the processor to receive speech from a user; and
a second module configured to control the processor to perform speech recognition on the speech using the speech model, wherein the speech model is generated by a method comprising:
retrieving for an individual a calling list associated with the individual;
identifying data of a social network associated with each number in the calling history;
refining the data of the social network based on at least one parameter, to yield refined data of the social network; and
creating, via a processor, a language model for the individual based on the refined data of the social network.

15. The spoken dialog system of claim 14, wherein the data of the social network comprises at least one of data corresponding to an entity, a business name, and a person's name.

16. The spoken dialog system of claim 14, wherein the speech model is generated by a method further comprising using the refined data of the social network to create a punctuation dictionary.

17. The spoken dialog system of claim 14, wherein the language model is one of a deterministic model and a stochastic model.

18. The spoken dialog system of claim 14, wherein the speech model is generated by a method further comprising dynamically modifying the language model based on additional data.

19. The spoken dialog system of claim 14, wherein the speech model is generated by a method further comprising implementing the language model in the spoken dialog system at a time based on a history of the individual and to anticipate user input.

20. The spoken dialog system of claim 14, wherein the speech model is generated by a method further comprising implementing the language model in a spoken dialog system.

* * * * *